(12) United States Patent  
Kondo et al.

(10) Patent No.: US 6,991,335 B2
(45) Date of Patent: Jan. 31, 2006

(54) LIQUID CRYSTAL PROJECTOR

(75) Inventors: Yoshihiro Kondo, Tsuchiura (JP);
Nariaki Shigyo, Yokohama (JP);
Katsunori Nakatani, Yokohama (JP);
Tatsuo Morita, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 30 days.

(21) Appl. No.: 10/817,001

(22) Filed: Apr. 5, 2004

(65) Prior Publication Data

US 2004/0257538 A1 Dec. 23, 2004

(30) Foreign Application Priority Data

Jun. 20, 2003 (JP) .............................. 2003-176652

(51) Int. Cl.
*G03B 21/14* (2006.01)
*G03B 21/18* (2006.01)
*G03B 21/22* (2006.01)

(52) U.S. Cl. ............................ 353/54; 353/20; 353/57; 353/60; 353/61; 353/119

(58) Field of Classification Search ................ 353/20, 353/30, 31, 52, 53, 54, 57, 60, 61, 85, 119; 349/58; 359/820
See application file for complete search history.

(56) References Cited

U.S. PATENT DOCUMENTS

| 4,101,424 A | 7/1978 | Schooley et al. ............ 250/504 |
| 4,763,993 A | 8/1988 | Vogeley .................. 350/331 T |
| 5,170,195 A | 12/1992 | Akiyama et al. ............. 353/54 |
| 6,844,993 B2 * | 1/2005 | Fujimori et al. ............ 359/820 |

FOREIGN PATENT DOCUMENTS

| EP | 0 511 829 | 11/1992 |
| EP | 1 329 934 | 7/2003 |
| GB | 464693 | 4/1937 |
| GB | 1 272 924 | 3/1972 |
| JP | 1-265226 | 10/1989 |
| JP | 5-107519 | 4/1993 |
| JP | 7-248480 | 9/1995 |
| JP | 8-273430 | 10/1996 |
| JP | 11-202411 | 7/1999 |
| JP | 11-288045 | 10/1999 |
| JP | 2002-107825 | 4/2002 |
| JP | 2002-131737 | 5/2002 |
| JP | 2002-268038 | 9/2002 |

* cited by examiner

*Primary Examiner*—Melissa J. Koval
(74) *Attorney, Agent, or Firm*—Antonelli, Terry, Stout and Kraus, LLP.

(57) ABSTRACT

In order to perform high efficient cooling without boiling cooling liquid and to improve maintainability such as replacement of a lamp, the present invention provides a liquid crystal projector including a light source lamp, a liquid crystal panel, a power source, a fan for removing heat generated by the power source and the lamp, a water-cooling jacket provided on an inner surface of an external wall portion opposed to the lamp in the liquid crystal projector, a metal pipe arrangement for radiation which is placed in the external wall portion, and a pump for driving cooling liquid to flow in the water-cooling jacket so that the cooling liquid receiving the heat from the lamp circulates in a circulation path through the water-cooling jacket, the metal pipe arrangement, and the pump to emit the heat to the outside through the metal pipe arrangement.

19 Claims, 13 Drawing Sheets

LIQUID CRYSTAL PROJECTOR

BACKGROUND OF THE INVENTION

The present invention relates to a cooling apparatus for a general electronics device, and particularly to a cooling apparatus for a lamp and a liquid crystal panel of a liquid crystal projector.

As a conventional technique of liquid cooling for a light source lamp of a liquid crystal projector or the like, it has been proposed to make cooled cooling fluid flow on a surface of a glass plate from a pipe arrangement provided on an upper portion of a light source so as to cool the light source, as shown in JP-A-8-273430, for example.

Also, as another conventional technique, it has been proposed to connect one end of a heat pipe to a heat pipe provided in a lamp sealing portion and connect the other end to a pipe through which cooling liquid flows so as to cool the light source, as shown in JP-A-11-288045, for example.

As a further conventional technique, it has been proposed to arrange a heat collecting member around a reflector of the light source and surround a periphery thereof by a closed vessel in which coolant is filled, so that the light source is cooled via the reflector by means of circulation of the coolant in the closed vessel, as shown in JP-A-2002-107825, for example.

Further, as a conventional technique of the liquid cooling for a liquid crystal panel of the liquid crystal projector or the like, it has been proposed to put a cooling liquid container in which the cooling liquid is filled and sealed in closely contact with the liquid crystal panel, as shown in JP-A-5-107519, for example, and to provide a transparent sheet-like cooling member between a liquid crystal panel plate and an incoming or outgoing polarizing plate, as shown in JP-A-7-248480, for example. Furthermore, it has been also proposed to cool the liquid crystal panel plate and an outgoing side polarizing plate which are closely contacted by sandwiching those with two closed vessels in which the coolant is encapsulated, as shown in JP-A-11-202411, for example, and to make the liquid flow into each liquid crystal panel and control a circulating pump using a temperature sensor so as to flow a circulating fluid to cool those, as shown in JP-A-5-264947, for example.

BRIEF SUMMARY OF THE INVENTION

However, all of the above-mentioned conventional techniques of cooling a light source lamp give no consideration to possibility of boiling of the cooling liquid used for the liquid cooling of the light source lamp of the liquid crystal projector or the like, rupture of a cooling liquid pipe, leak of the cooling liquid, difficulty in maintenance and replacement of the lamp as a consumable part, deterioration in cooling performance due to an installation location thereof, for example, in the case of being installed upside down (the deterioration in cooling performance is caused in the case of placing a liquid phase source on an upper side in a conventional heat pipe method), and so on.

Further, all of the above-mentioned conventional techniques of cooling a liquid crystal panel give no consideration to influence on light irradiation in the case of flowing liquid as the liquid cooling of the liquid crystal panel of the liquid crystal projector or the like, liquid fluctuation due to a difference between the liquid temperature and the liquid surface temperature, and occurrence of a stripe pattern.

Accordingly, a main object of the invention is to efficiently radiate the heat generated inside the liquid crystal projector, and in particular, generated in the light source lamp and the liquid crystal panel.

More precisely, a first object of the invention is to provide the liquid crystal projector capable of performing efficient cooling without causing the cooling liquid to boil, and of improving the maintenance property such as replacement of the lamp. Also, a second object is to provide the liquid crystal projector capable of avoiding an adverse effect on an outgoing beam from the liquid crystal projector due to flowing of the cooling liquid, and of implementing high reliability and the efficient cooling of the liquid crystal panel.

In order to solve the above problems, the present invention adopts the following configurations, mainly.

The liquid crystal projector includes a light source lamp, a liquid crystal panel for displaying at least one color of red, green and blue, a power source for supplying electric power to an element in the liquid crystal projector, and a fan for removing heat generated by the power source and the lamp, and is configured so that a water-cooling jacket is provided on an inner surface of a part of an external wall of the liquid crystal projector, which part is adjacent to the lamp, a metal pipe arrangement for heat radiation is placed in a part of the external wall except the part of the external wall having the water-cooling jacket on the inner surface thereof, a cooling liquid driving means is provided for driving cooling liquid to flow in the water-cooling jacket receiving the heat radiated from the lamp, and the cooling liquid receiving the heat generated by the lamp circulates in a circulation path through the water-cooling jacket, the metal pipe arrangement and the cooling liquid driving means to emit the heat to the outside through the metal pipe arrangement.

Also, the above described liquid crystal projector is configured so that a relaxation member for curbing heat transmission and lowering the temperature of the cooling liquid is provided between an external surface of the lamp and the water-cooling jacket so as to contact both the external surface of the lamp and the water-cooling jacket.

Also, the above described liquid crystal projector is configured so that a plurality of metallic heat absorbing fins are provided on the water-cooling jacket between an external surface of the lamp and the water-cooling jacket, whereby an air layer is formed between tip ends of the heat absorbing fins and the external surface of the lamp.

Also, the above described liquid crystal projector is configured so that a relaxation member constituted by combining a plurality of metal plates and a heat insulator provided between the metal plates for lowering the temperature of the cooling liquid is provided between an external surface of the lamp and the water-cooling jacket so as to contact both the external surface of the lamp and the water-cooling jacket.

Also, the above described liquid crystal projector is configured so that the part of the external wall having the water-cooling jacket on the inner surface thereof is mounted rotatably, or movably.

By adopting these configurations, it becomes possible to prevent the boiling of the cooling liquid and keep the high reliability of the projector because the cooling liquid does not directly contact the light source lamp of high temperature. It becomes also possible to simply detach the water-cooling jacket for receiving the heat from the lamp, and easily perform attaching and detaching work when replacing or maintaining the lamp. Further, it becomes possible to keep a sufficient heat transport amount to maintain the same cooling performance irrespective of an installation condition of the projector.

Furthermore, the liquid crystal projector includes a light source lamp, a liquid crystal panel for displaying at least one color of red, green and blue, a power source for supplying electric power to each element in the liquid crystal projector, and a fan for removing heat generated by the liquid crystal panel and the lamp, and is configured so that a water-cooling jacket is provided on the liquid crystal panel comprising an incoming polarizing plate, a liquid crystal panel body and an outgoing polarizing plate, thorough which water-cooling jacket cooling liquid flows, a metal pipe arrangement for heat radiation is placed in an external wall portion of a housing of the liquid crystal projector, a cooling liquid driving means is provided for driving the cooling liquid to flow in the water-cooling jacket receiving the heat radiated from the liquid crystal panel, and the cooling liquid receiving the heat generated by the lamp circulates in a circulation path through the water-cooling jacket, the metal pipe arrangement and the cooling liquid driving means to emit the heat the outside through the metal pipe arrangement.

By adopting the configuration, it becomes possible to avoid the adverse effect on the outgoing beam from the liquid crystal projector due to the flow of the cooling liquid.

Other objects, features and advantages of the invention will become apparent from the following description of the embodiments of the invention taken in conjunction with the accompanying drawings.

DETAILED DESCRIPTION OF THE INVENTION

Figure 1:
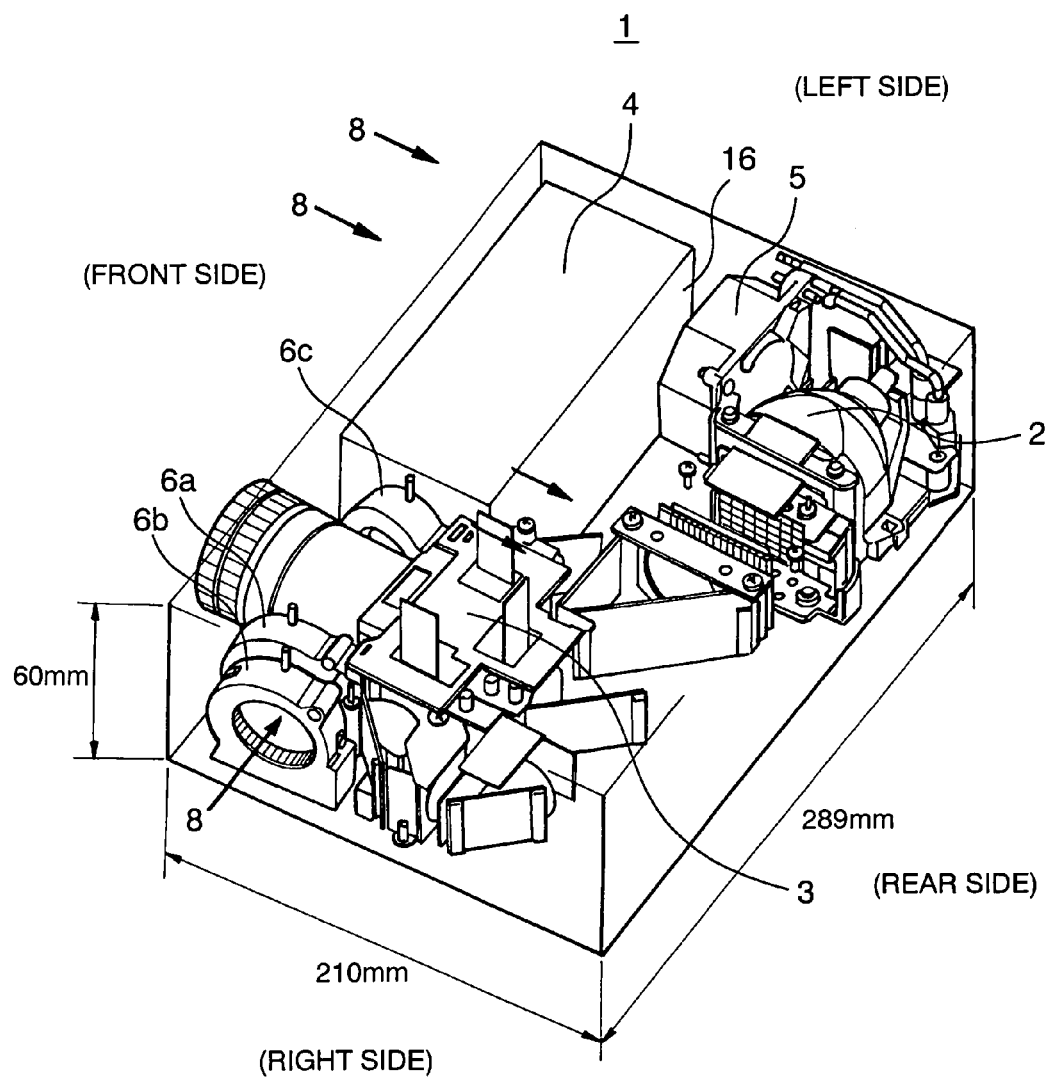
FIG. 1 is a perspective view showing a mounted arrangement of a liquid crystal projector having a power source, a fan, a liquid crystal panel, a light source lamp and so on, of an embodiment according to the present invention.
Figure 2:
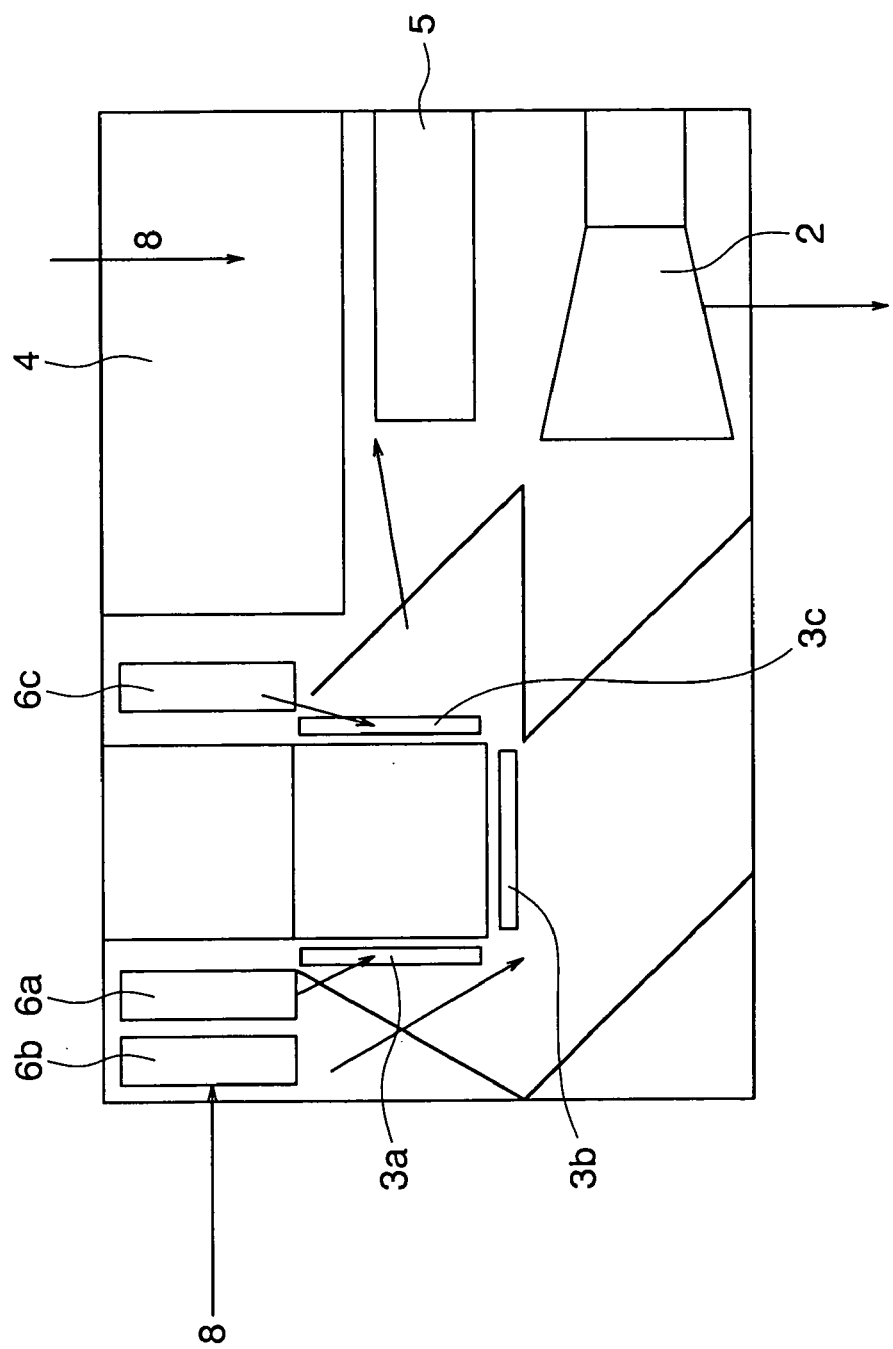
FIG. 2 is a plan view showing the mounted arrangement and air flow of the liquid crystal projector, of the embodiment according to the present invention.
Figure 3:
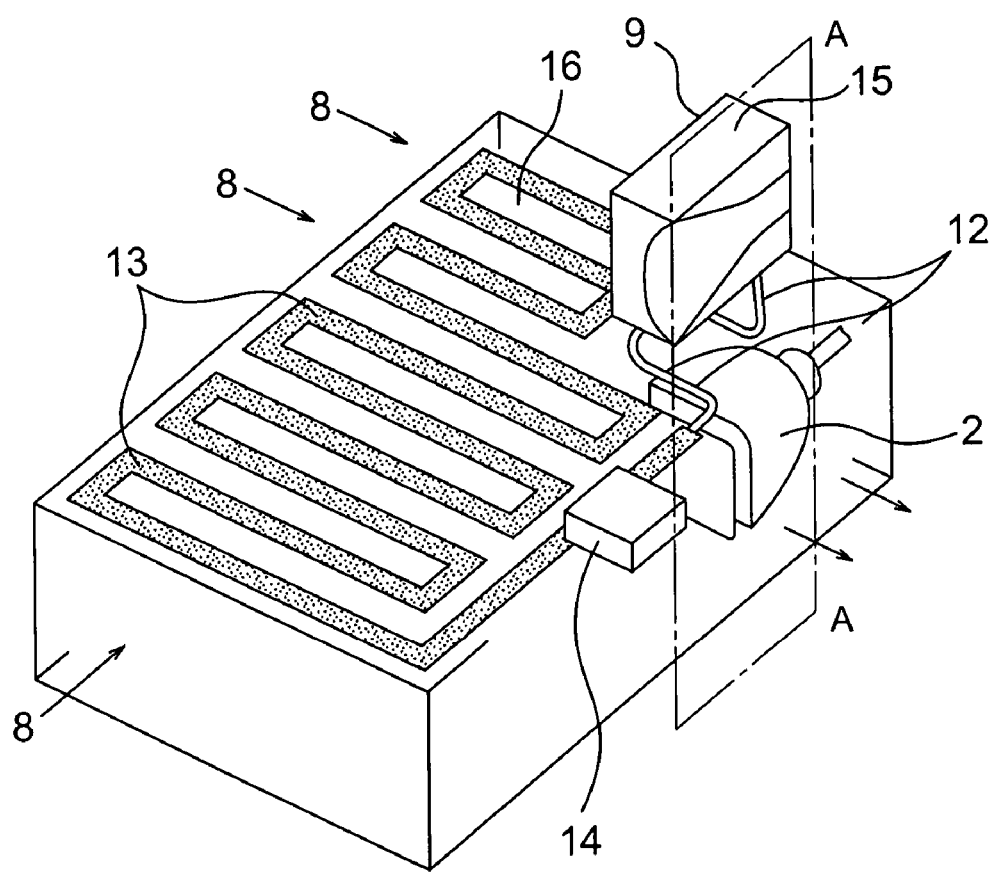
FIG. 3 is a perspective view showing the mounted arrangement of a cooling apparatus in the case of turning and opening a water-cooling jacket in the liquid crystal projector of the present embodiment.

A liquid crystal projector according to the present invention will be described in detail below by referring to FIGS. 1 to 9. FIG. 1 is a perspective view showing a mounted arrangement of a liquid crystal projector having a power source, a fan, a liquid crystal panel, a light source lamp and so on, of an embodiment according to the present invention, and FIG. 2 is a plan view showing the mounted arrangement and air flow of the liquid crystal projector, of the embodiment according to the present invention. FIG. 3 is a perspective view showing the mounted arrangement of a cooling apparatus in the case of turning and opening a water-cooling jacket in the liquid crystal projector of the present embodiment.

Figure 4:
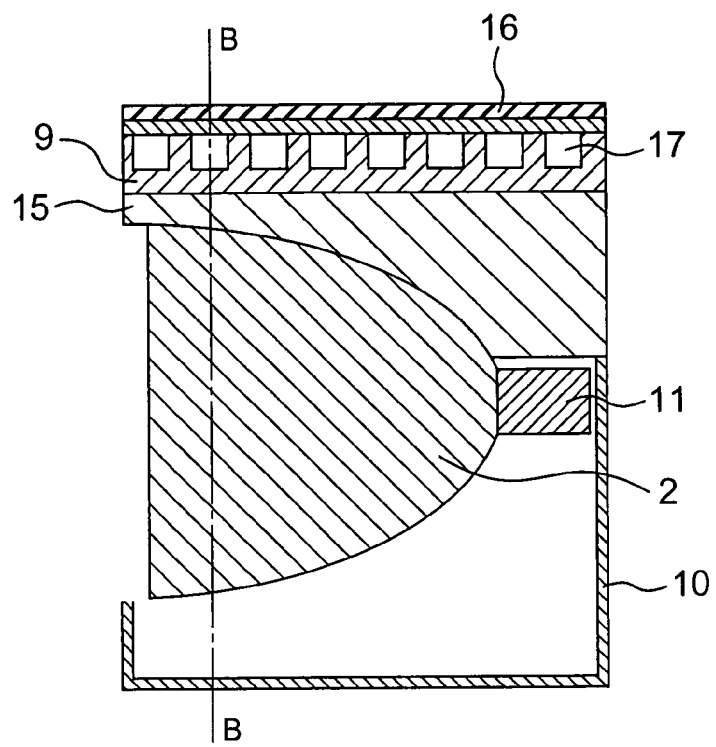
FIG. 4 is a sectional view taken along the line A—A at the center of a lamp in FIG. 3 in a state of the water-cooling jacket being mounted.
Figure 5:
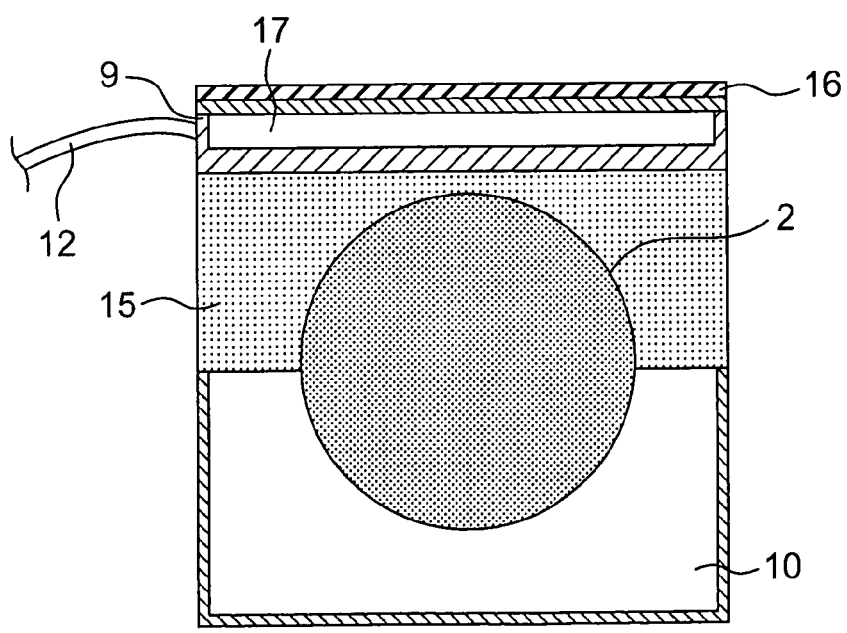
FIG. 5 is a sectional view taken along the line B—B at a tip end of the lamp in FIG. 4.
Figure 6:
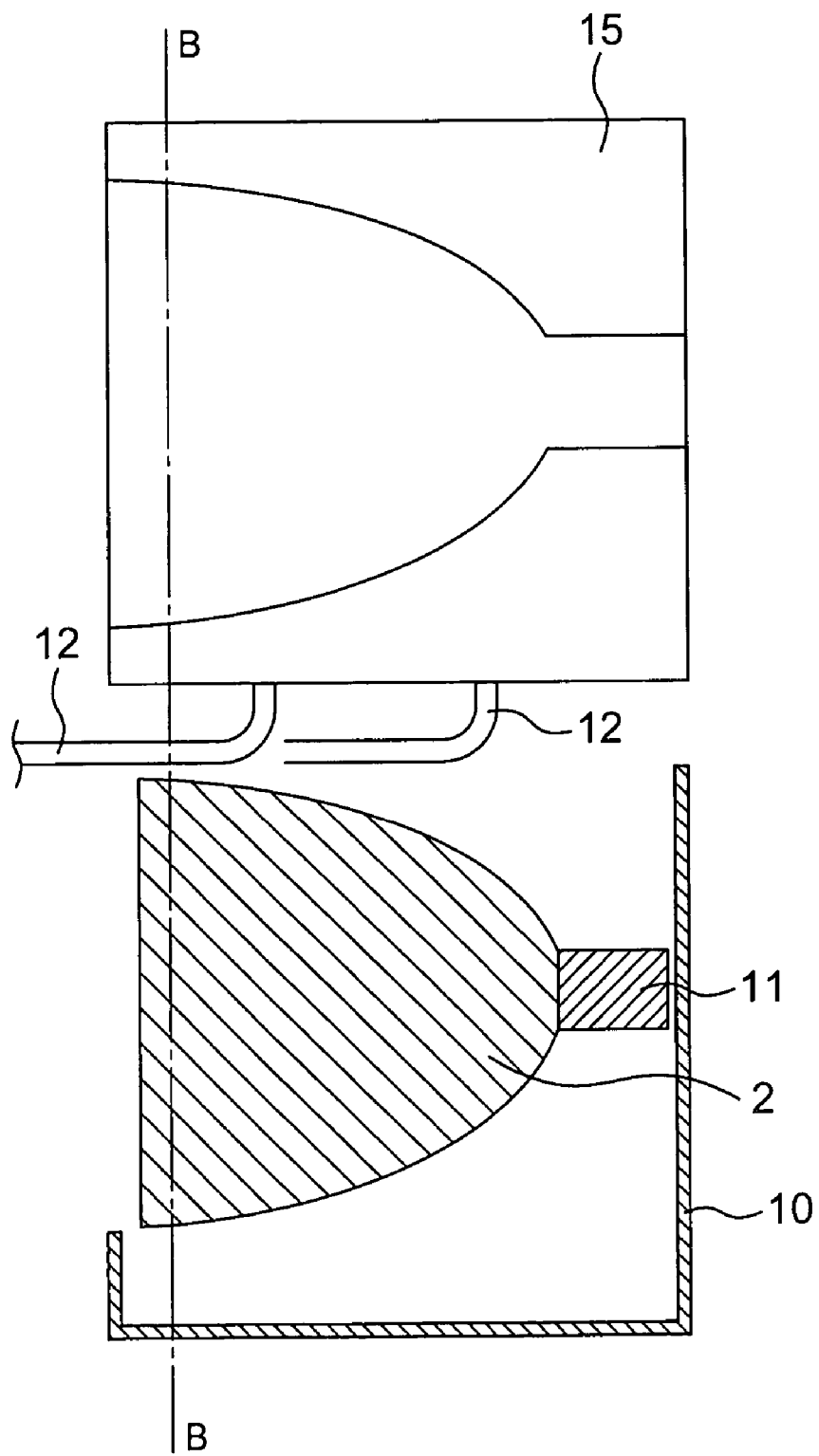
FIG. 6 is a sectional view taken along the line A—A at the center of the lamp in FIG. 3 in the state of the water-cooling jacket being turned and opened.
Figure 7:
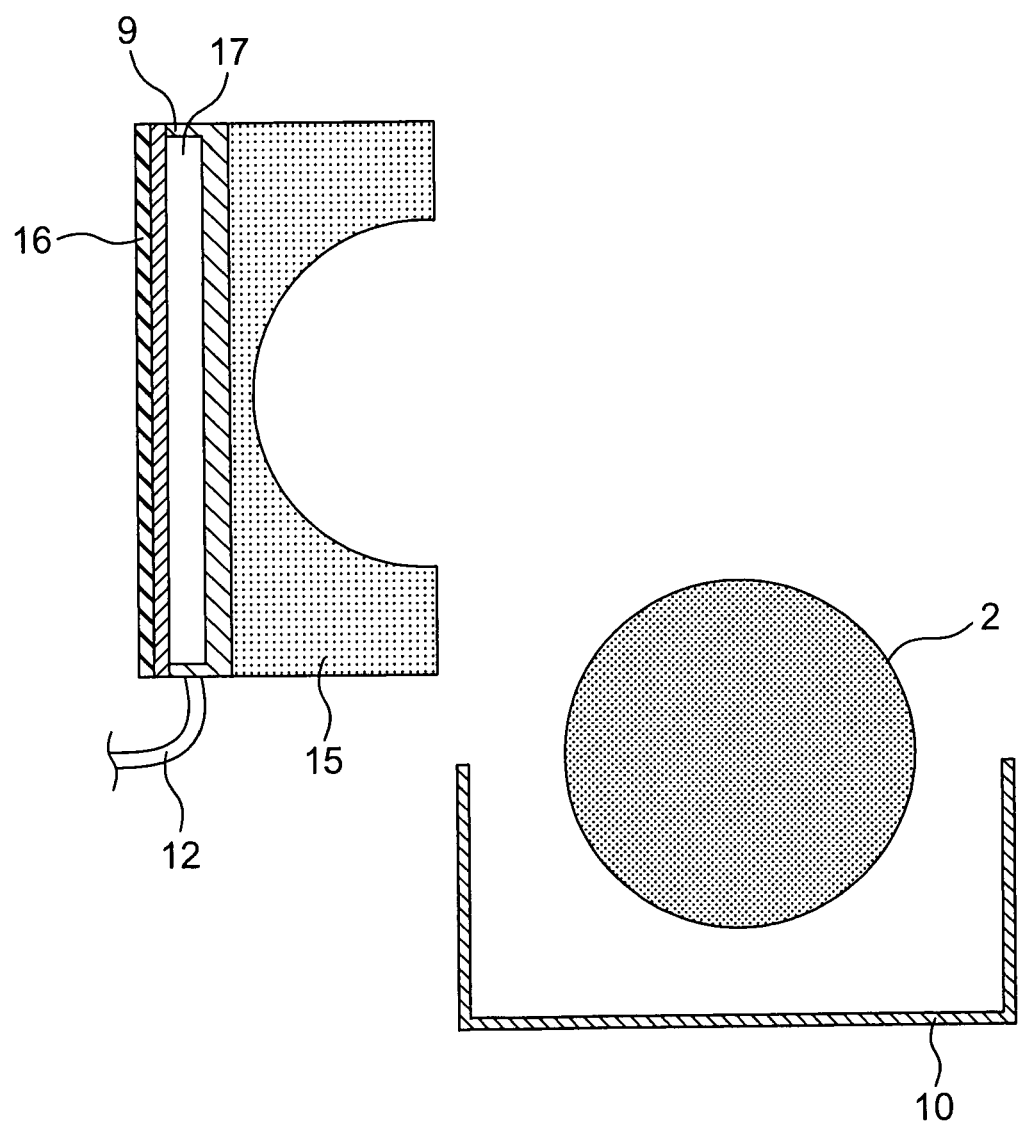
FIG. 7 is a sectional view taken along the line B—B at a tip end of the lamp in FIG. 6.

Also, FIG. 4 is a sectional view taken along the line A—A at the center of a lamp in FIG. 3 in a state of the water-cooling jacket being mounted, and FIG. 5 is a sectional view taken along the line B—B at a tip end of the lamp in FIG. 4. FIG. 6 is a sectional view taken along the line A—A at the center of the lamp in FIG. 3 in the state of the water-cooling jacket being turned and opened, and FIG. 7 is a sectional view taken along the line B—B at a tip end of the lamp in FIG. 6.

Here, reference number 1 denotes a liquid crystal projector, 2 denotes a lamp, 3 denotes a liquid crystal panel, 4 denotes a power source, 5 denotes an axial fan, 6 denotes a sirocco fan, 8 denotes cooling wind, 9 denotes a water-cooling jacket, 10 denotes a lamp cover, 11 denotes a lamp neck, 12 denotes a flexible tube, 13 denotes a fixed pipe arrangement, 14 denotes a cooling liquid driving means, 15 denotes a relaxation member, 16 denotes an external wall, 17 denotes a water channel, 18 denotes a fin, and 19 denotes an air layer, respectively.

In reference to FIGS. 1 and 2, the liquid crystal projector 1 includes at least the lamp 2 as a light source, the liquid crystal panels 3a, 3b and 3c for displaying red (R), green (G) and blue (B), respectively, and the power source 4 for supplying power to each element in the liquid crystal projector 1. Further, the axial fan 5 is provided for removing heat of the power source 4 and the lamp 2. The sirocco fans 6a, 6b and 6c are provided for hear dissipation of the liquid crystal panels 3a, 3b and 3c, respectively.

In a configuration example in FIG. 1, an axial fan is used for the fan 5, and sirocco fans are used for the fans 6a–6c. However, the fans 5 and 6 are not limited to these types of fans while an adequate one may be selected from various fans based on the balance between the ventilation amount and the entire pressure loss. Also, the light emitted from the lamp 2 passes through a mirror and the liquid crystal panels R, G and B, and is irradiated on a screen or the like.

The cooling wind (which is taken for cooling by taking outside air) 8 is inhaled from a side of the sirocco fan 6 to pass through the liquid crystal panels 3a–3c so as to cool the liquid crystal panels 3a–3c. Thereafter, the cooling wind 8 is exhaled toward a ceiling board which is an external wall, and flows along the ceiling board. Then, as indicated by an arrow in FIG. 2, it is emitted to outside air through a lower portion of the lamp 2 by the axial fan 5. Also, the cooling wind 8 coming in from a side of the power source 4 is emitted to the outside air through a circumference of the lamp 2 by the axial fan 5.

In observing the distribution of heat generation of the liquid crystal projector 1, the heating value of the lamp 2 is significant. Therefore, the temperature of a housing as the external wall adjacent to the lamp 2 is higher than other portions. The reason that the housing temperature adjacent to the lamp 2 is higher is because of heat radiation and heat conduction from the lamp 2. According to the embodiment of the present invention, the water-cooling jacket 9 is provided in an upper portion of the lamp 2 in order to remove a part of heat generation of the lamp 2, in reference to FIG. 3. A passage in which the cooling liquid flows is formed inside the water-cooling jacket 9. Further, the water-cooling jacket 9 has two flexible tubes 12 mounted thereon, one of which is connected to the fixed pipe arrangement 13 comprised of a metal, and the other of which is connected to a connection port of the cooling liquid driving means 14, respectively. The fixed pipe arrangement 13 is thermally communicated with the external wall of the liquid crystal projector 1, for example, with the upper external wall 16.

In FIG. 3, the cooling liquid driving means 14 such as a pump is installed between the water-cooling jacket 9 and the fixed pipe arrangement 13. A closed-loop cooling liquid circulation flow channel is formed in order of the water-cooling jacket 9, the flexible tube 12, the fixed pipe arrangement 13, the cooling liquid driving means 14, the flexible tube 12 and the water-cooling jacket 9. The reason for using the flexible tube 12 is because the assembly and maintenance properties of liquid crystal projector components around the water-cooling jacket 9, in particular of the lamp 2 are considered. If the consideration is not necessary, a metal pipe arrangement or the like may be used.

According to this embodiment, a part of the heat emitted from the lamp 2 is removed by the axial fan 5, and the other part of the heat is received by the water-cooling jacket 9 and the cooling liquid therein. The heat received by the cooling liquid in the water-cooling jacket 9 is carried to the fixed pipe arrangement 13 by the cooling liquid driving means 14 so as to be removed to the atmosphere through the external wall of the liquid crystal projector 1.

Here, since the temperature of a reflector surface of the lamp 2 reaches several hundred degrees (° C.), there is a possibility that the cooling liquid may be boiled and thus not sufficiently cool the lamp if the water-cooling jacket 9 directly contacts or is mounted on the lamp 2.

Thus, one of the characteristics of this embodiment is to provide a temperature relaxation member 15 capable of limiting the heat conduction amount from the lamp 2 to the water-cooling jacket 9. Details of this characteristic will be described below, in reference to FIGS. 4 and 5.

The liquid crystal projector 1 is turned off in power after use or during the maintenance of the lamp 2 (replacement or repair of the lamp, for example). Immediately after turning off the power, the temperature of the lamp 2 is high and thus it is necessary to drive the axial fan 5 for a long time to sufficiently cool it in the case that the axial fan 5 is provided alone. As shown in this embodiment, by adopting the water-cooling jacket 9, it is possible to efficiently cool the lamp 2 with a large-area housing surface of the liquid crystal projector 1, so that it is not necessary to drive the axial fan 5 for a long time for the sake of cooling the lamp 2. It is thereby possible to reduce the time required for the maintenance of the lamp 2.

Next, another characteristic of the embodiment of the present invention will be described. FIG. 3 shows a state that the water-cooling jacket 9 has been turned or moved when attaching or detaching the lamp 2 of the liquid crystal projector 1. The water-cooling jacket 9 according to this embodiment is attached to the housing (external wall) of the liquid crystal projector 1, and the housing having the water-cooling jacket attached thereto is rotatable with respect to the housing (the housing around the housing having the water-cooling jacket attached thereto) by means of a hinge or the like. The flexible tubes 12 are provided between the water-cooling jacket 9 and the fixed pipe arrangement 13, and the water-cooling jacket 9 and the connection port of the cooling liquid driving means 14, respectively so as to render the water-cooling jacket 9 smoothly rotatable from the lamp 2 side. Accordingly, it is possible to easily perform the maintenance work, including the replacement of the lamp 2.

Next, one of the characteristics of this embodiment shown in FIGS. 4 and 5 will be described. FIG. 4 is a sectional view taken along the line A—A passing on an optical axis of the lamp in the state of having the water-cooling jacket closed in FIG. 3. FIG. 5 is the B—B sectional view of FIG. 4. In FIGS. 4 and 5, the lamp 2 to which the power is supplied through the lamp neck 11 is mounted in a lamp cover 10. The relaxation member 15 for relaxing the heat conduction of the heat generated by the lamp and for lowering the cooling liquid temperature is provided on a top surface of the lamp 2, and the water-cooling jacket 9 is placed through the relaxation member 15. A plurality of water channels 17 for passing the cooling liquid are provided inside the water-cooling jacket 9.

The water channels 17 are directly connected with each other so that the cooling fluid flows all around there (not shown). In the configuration example in FIG. 4, the channels 17 are provided vertically to a light emission direction of the lamp 2. However, the channels 17 may be made in any direction. The water-cooling jacket 9 is mounted on the external wall 16 of the liquid crystal projector. A part of the heat emitted from the lamp 2 is conveyed to the cooling liquid through the relaxation member 15, the water-cooling jacket 9 and the water channels 17 of the water-cooling jacket 9. In the lower portion of the lamp 2, the heat is emitted to the outside by conventional air cooling by the axial fan 5.

In FIG. 5, an upper half of the lamp 2 is covered by the relaxation member 15. The plurality of water channels 17 for passing the cooling liquid are provided inside the water-cooling jacket 9 (see FIG. 4). The flexible tube 12 for providing the cooling liquid is provided at an end of the water-cooling jacket 9. The flexible tubes 12 are provided at two locations of an inlet and an outlet of the cooling liquid to the water-cooling jacket 9.

According to the embodiment shown in FIGS. 4 and 5, the relaxation member for lowering the temperature is provided between the light source lamp 2 and the water-cooling jacket 9 of the liquid crystal projector. Accordingly, the cooling liquid is not directly contacted with the light source lamp of high temperature so that the cooling liquid is prevented from being boiled.

Next, FIG. 6 is a sectional view through an optical axis of the lamp 2 taken along the line A—A in FIG. 3, and shows the state that the water-cooling jacket 9 attached to the external wall (housing) 16 of the liquid crystal projector has been detached for maintaining and replacing the lamp 2. The external wall for attachment of the water-cooling jacket is rotatable by means of a hinge or the like. It may also be a simple detachable configuration. For this reason, the flexible tubes 12 are used to provide the cooling liquid to the water-cooling jacket, so that a flexible configuration which is hardly subject to stress such as an abnormal pull load upon moving the water-cooling jacket is achieved. In FIG. 6, only the relaxation member 15 is visible because the water-cooling jacket is turned and opened. Thus, it is possible to simply move the water-cooling jacket 9 and easily carry out the maintenance of the lamp 2.

In FIG. 7 showing the B—B section of FIG. 6, the water-cooling jacket 9 is attached to the external wall 16 of the liquid crystal projector. Therefore, it is possible to move the water-cooling jacket 9 by detaching or turning the external wall 16. In that case, it is possible to easily move the water-cooling jacket 9 and simply perform the maintenance of the lamp 2, by using the flexible tubes 12 for circulating the cooling liquid.

Figure 8:
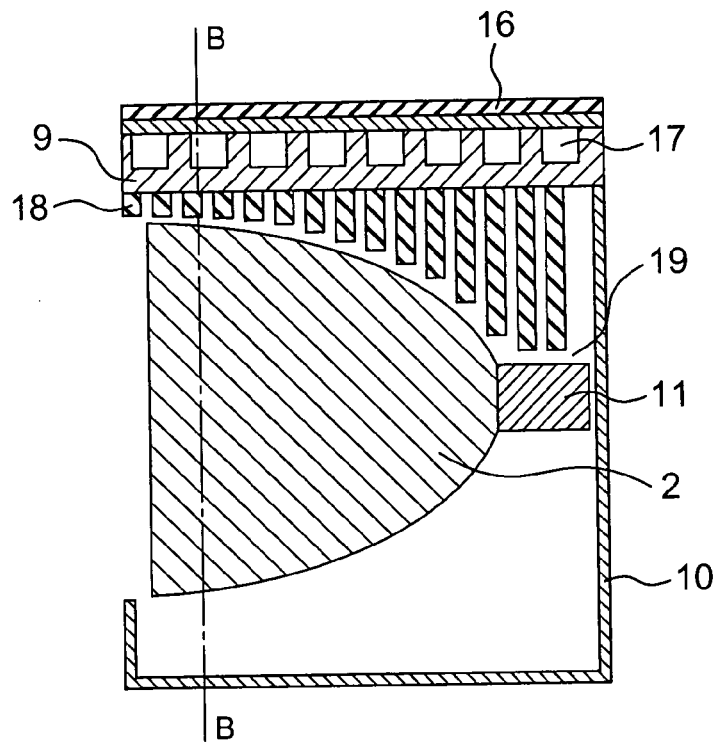
FIG. 8 is a sectional view showing another configuration example of a relaxation member of an embodiment according the present invention.
Figure 9:
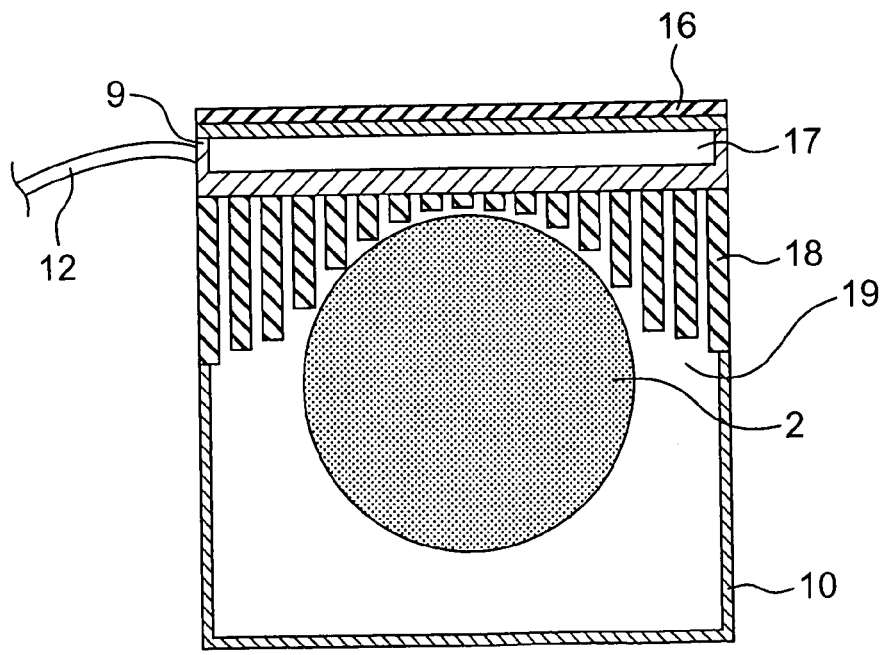
FIG. 9 is a sectional view taken along the line B—B at a tip end of the lamp in FIG. 8.

Next, another configuration example of the relaxation member according to the embodiment of the present invention will be described with reference to FIGS. 8 and 9. FIG. 8 is a sectional view showing another configuration example of the relaxation member according to the embodiment of the present invention, and FIG. 9 is a sectional view taken along the line B—B at the end of the lamp in FIG. 8.

In describing only differences from the configuration in FIGS. 4 and 5, the heat absorbing fins (endothermic fins) 18 are provided instead the relaxation member 15 in FIG. 4, and are vertically placed with respect to an optical axis direction of the lamp 2. The endothermic fin 18 is made of a metallic material such as aluminum or copper, and constitutes a prismatic or cylindrical shape. A sectional form of the fin 18 is not limited to a circle or a polygon, but may be a similar shape. The direction of the fins 18 is not limited to a vertical direction, but may be an arbitrary direction. According to the configuration example of the embodiment, the air layer 19 is formed between the ends of the endothermic fins 18 and the lamp 2, and the endothermic fins 18 do not directly contact the lamp 2. The air layer is also provided between the fins 18. The material of the fins 18 may be the same as that of the water-cooling jacket 9 to make an integral configuration, and further, it may be subjected to a surface treatment for improving a heat-receiving effect, such as the application of black-body paint.

By forming the fins 18 in the integral configuration with the water-cooling jacket, it is possible to substantially expand the surface area of the water-cooling jacket so as to enhance the endothermic effect. Further, it is also possible to further expand the heat transfer area by providing irregularities on the surfaces of the fins. Since the air layer is provided between the fins and the lamp and between the fins, the heat emitted from the lamp 2 has a temperature difference made in the air layer, and is absorbed by the fins 18 having a large endothermic area. Then, it is conveyed to the cooling liquid through the water-cooling jacket 9 and the water channels thereof so as to be radiated through the fixed metal pipe arrangement 13.

As described in the above, the radiating effect of the lamp has been inferior in the case where only the air layer is provided between the water-cooling jacket and the lamp, and there has been a possibility of boiling the cooling liquid in the case where the endothermic fins are in contact with the lamp. However, as opposed to such disadvantages, the configuration example of this embodiment shown in FIGS. 8 and 9 prevents the boiling of the cooling liquid and also performs a lamp radiating function by providing the air layer between the fins and the lamp and between the fins to expand the surface area of the water-cooling jacket due to the fins.

Further, a further configuration example of the relaxation member according to this embodiment will be described. Although this configuration example is not shown, it is the configuration combining a plurality of metal plates extending from the water-cooling jacket 9 to the lamp 2 and heat insulators (a resin material, for example) placed among the metal plates, for example. The relaxation member also has a vibrational absorption function of protecting the lamp 2 from vibration in addition to the function of lowering the lamp heating temperature. Because of adoption of the relaxation member, the water-cooling jacket 9 receives the heat of the lamp 2 without the temperature thereof becoming high enough to boil the cooling liquid, and absorbs external vibration in addition, which is also desirable in terms of reliability of the lamp. It is possible, by appropriately selecting cross-sectional areas of the metal plate and the heat insulators in this configuration example, to perform the function of lowering the temperature to prevent the boiling of the cooling liquid.

Therefore, it is possible to perform safe and efficient cooling of the lamp 2. If the heat transmission amount from the lamp 2 to the water-cooling jacket 9 is excessively limited, the cooling amount of the entire lamp 2 becomes insufficient. Therefore, there is an optimum value of the heat transmission amount, and this value may be determined on the basis of the balance between the heat transmission amounts of a water-cooling portion by the water-cooling jacket and an air-cooling portion by the fan.

As described in the above, the liquid crystal projector according to the embodiment of the present invention can effectively implement the following configuration, function and action. That is, there is provided one wherein a temperature reduction relaxation member is provided between a reflector portion of the light source lamp and the water-cooling jacket for heat absorption of the liquid crystal projector, or one wherein the surface area of the water-cooling jacket on the reflector side is substantially expanded. A cooling liquid pipe for joining the water-cooling jacket is a flexible pipe, and the water-cooling jacket is rotatably or movably mounted on the housing (external wall) in consideration of convenience when attaching and detaching the lamp.

Further, the cooling liquid driving means is provided between the water-cooling jacket and a radiating portion so as to circulate the cooling liquid in the cooling liquid driving means, the water-cooling jacket, and the radiating portion.

By adopting such a configuration, it is possible to prevent the boiling of the cooling liquid and to keep the high reliability of the projector because the cooling liquid is not directly influenced by the light source lamp of high temperature. It is also possible to simply detach the water-cooling jacket for heat absorption from the lamp and easily perform attaching and detaching work when replacing the lamp as the life component. It is further possible to keep the sufficient amount of heat transport by a circulating configuration of the cooling liquid so as to maintain the same cooling performance irrespective of an installation condition of the projector.

Figure 10A:
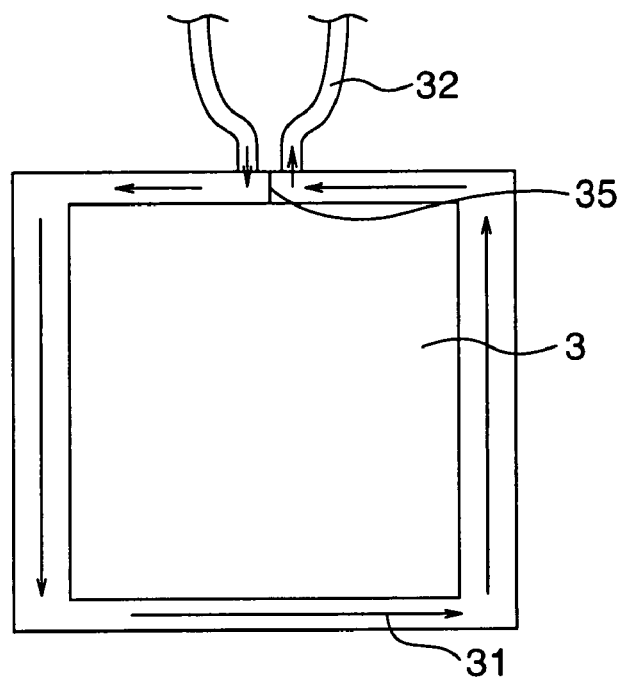
FIGS. 10A and 10B are a front view and a side view showing arrangement and configuration examples of the liquid crystal panel and the water-cooling jacket in the liquid crystal projector according to another embodiment of the present invention.
Figure 10B:
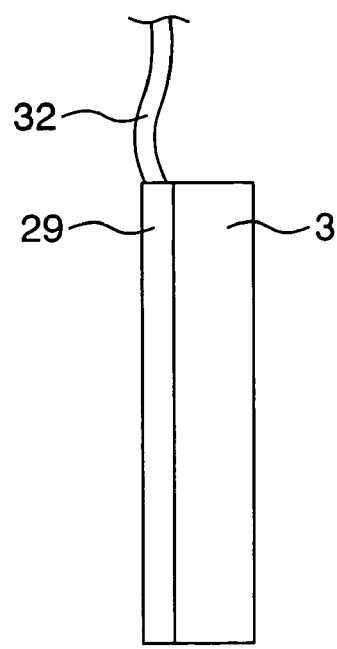
Figure 11:
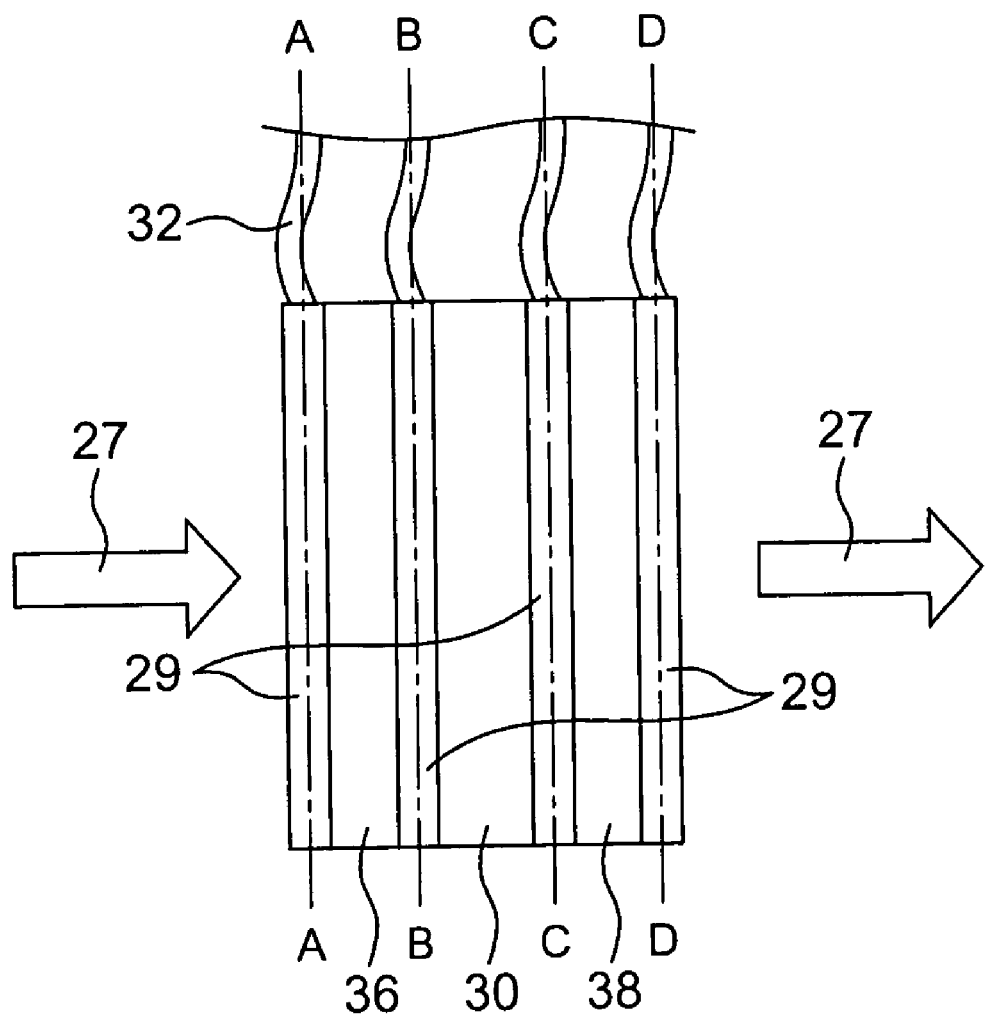
FIG. 11 is a diagram showing the arrangement and configuration example of the water-cooling jackets, and an incoming polarizing plate, a liquid crystal panel body and an outgoing polarizing plate constituting the liquid crystal panel according to the other embodiment of the present invention.

Next, the liquid crystal projector according to the other embodiment of the present invention will be described in detail below in reference to FIGS. 10 to 17. FIGS. 10A and 10B are a front view and a side view showing arrangement and configuration examples of the liquid crystal panel and the water-cooling jacket in the liquid crystal projector according to another embodiment of the present invention, FIG. 11 is a diagram showing the arrangement and configuration example of the water-cooling jackets, and an incoming polarizing plate, a liquid crystal panel body and an outgoing polarizing plate constituting the liquid crystal panel according to the other embodiment of the present invention, FIG. 12 corresponds to the A—A sectional view and the C—C sectional view of FIG. 11 for showing the flow of the cooling liquid, and FIG. 13 corresponds to the B—B sectional view and the D—D sectional view of FIG. 11 for showing the flow of the cooling liquid.

Figure 14A:
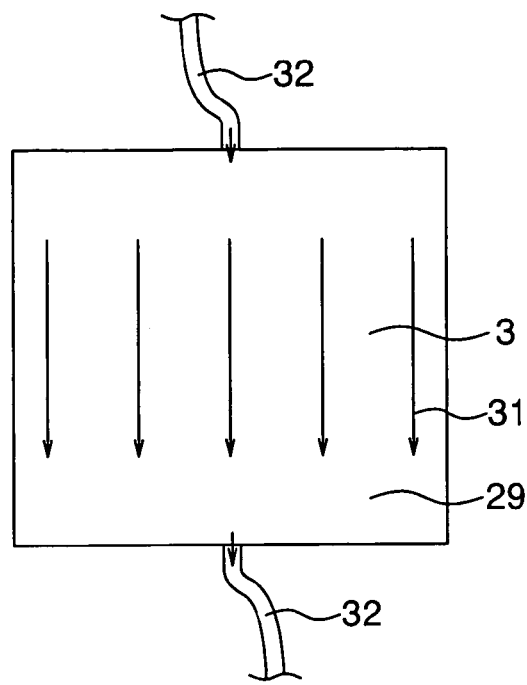
FIGS. 14A and 14B are a front view and a side view showing another configuration example of the liquid crystal panel and the water-cooling jacket according to the other embodiment of the present invention.
Figure 14B:
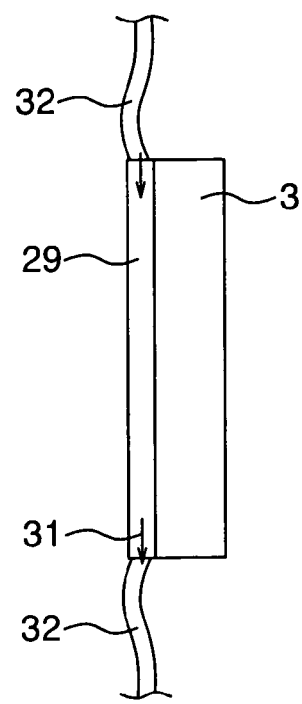
Figure 15:
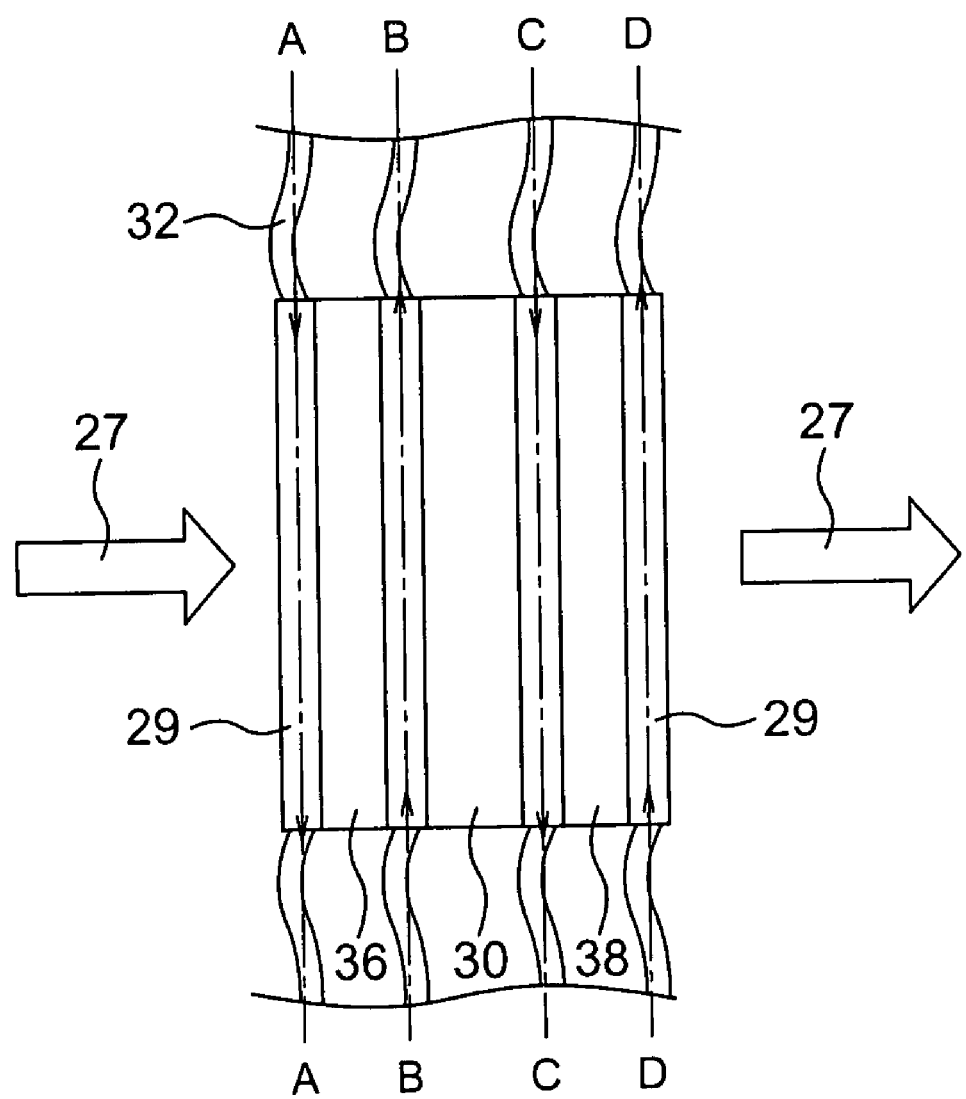
FIG. 15 is a diagram showing another configuration example of the water-cooling jacket and the incoming polarizing plate, the liquid crystal panel body and the outgoing polarizing plate constituting the liquid crystal panel according to the other embodiment of the present invention.
Figure 16:
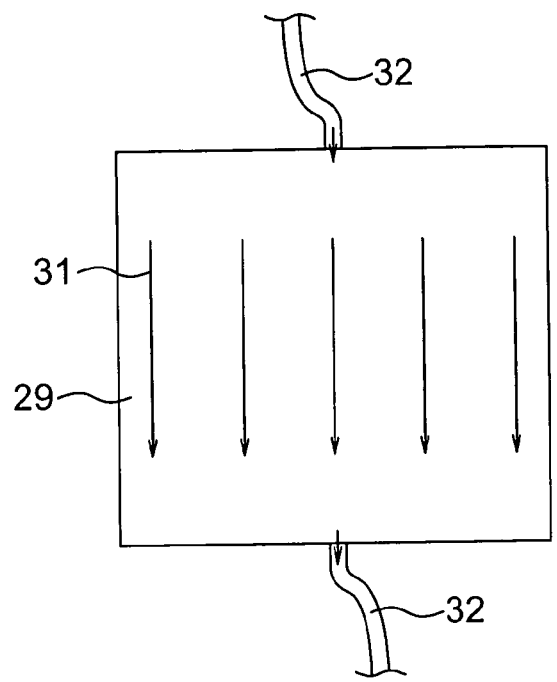
FIG. 16 corresponds to the A—A sectional view and the C—C sectional view of FIG. 15 for showing the flow of the cooling liquid.
Figure 17:
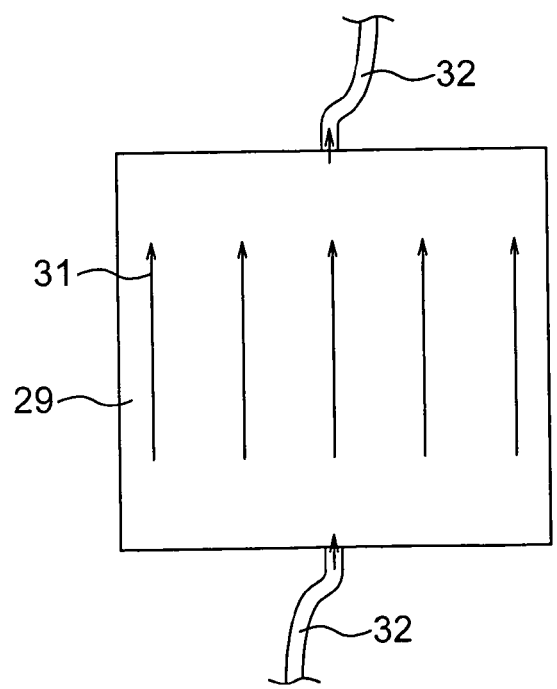
FIG. 17 corresponds to the B—B sectional view and the D—D sectional view of FIG. 15 for showing the flow of the cooling liquid.

Further, FIGS. 14A and 14B are a front view and a side view showing another configuration example of the liquid crystal panel and the water-cooling jacket according to the other embodiment of the present invention, FIG. 15 is a diagram showing another configuration example of the water-cooling jacket and the incoming polarizing plate, the liquid crystal panel body and the outgoing polarizing plate constituting the liquid crystal panel according to the other embodiment of the present invention, FIG. 16 corresponds to the A—A sectional view and the C—C sectional view of FIG. 15 for showing the flow of the cooling liquid, and FIG. 17 corresponds to the B—B sectional view and the D—D sectional view of FIG. 15 for showing the flow of the cooling liquid. The other embodiment of the present invention has a basic configuration in common with the embodiment of the present invention shown in the aforementioned FIGS. 1 to 9 and thus, a description will be given with reference to the configuration shown in FIGS. 1 to 3.

In the drawings, reference number 3 denotes the liquid crystal panel, 29, 29R, 29G and 29B denote the water-cooling jackets (which may also be liquid-cooling heat-receiving jackets other than the water-cooling ones), 30 denotes the liquid crystal panel body, 31 denotes the cooling liquid, 32 denotes the flexible tube, 36 denotes the incoming polarizing plate, 38 denotes the outgoing polarizing plate, and 39 denotes space.

The light emitted from the lamp 2 passes through the liquid crystal panel 3 to be irradiated on a screen or the like. As shown in FIG. 2, three liquid crystal panels 3*a*, 3*b* and 3*c* for R (red), G (green) and B (blue) are provide in a standing posture. Further, in order to remove a part of the heat of the liquid crystal panels 3, the water-cooling jackets 29R, 29G and 29B are provided on the liquid crystal panels 3, respectively. The water-cooling jackets 29R, 29G and 29B have the channels for the flow of the cooling liquid, such as water, formed inside. Furthermore, the water-cooling jackets 29R, 29G and 29B have two flexible tubes 32 mounted thereon, and the fixed pipe arrangement 13 (see FIG. 3) is mounted at an end of each flexible tube 32. The fixed pipe arrangement 13 is thermally joined to the external wall of the liquid crystal projector 1.

In other words, each of the liquid crystal panels R, G and B shown in FIG. 2 has the two flexible tubes 32 shown in FIGS. 10A and 10B mounted thereon, and the ends of the flexible tubes 32 on the opposite side to the liquid crystal panels are connected to the fixed pipe arrangement 13 shown in FIG. 3 (not shown). More specifically, the fixed pipe arrangement 13 is cut at three locations opposed to the liquid crystal panels R, G and B placed as shown in FIG. 2, and each flexible tube 32 of each of the liquid crystal panels 3 is connected to each cut section thereof. Thus, the liquid crystal panels R, G and B are serially connected through the fixed pipe arrangement 13 and each flexible tube 32, respectively. It is also possible to cut the fixed pipe arrangement 13 at one location and connect three flexible tubes 32 and the liquid crystal panels to the one location, in parallel.

Furthermore, the cooling liquid driving means 14 for supplying the liquid to the water-cooling jackets 29R, 29G and 29B and the fixed pipe arrangement 13 such as a pump is provided. The cooling liquid circulates through a closed-loop. A part of the heat emitted from the liquid crystal panels 3 is removed by the fan 6 as shown in FIGS. 1 and 2, and the other part of the heat is received by the water-cooling jackets 29R, 29G and 29B.

On the other hand, if temperature distribution arises on the liquid crystal panels 3 which are the guts of the liquid crystal projector 1, color shading, color drift and so on are caused in the light irradiation. Therefore, it is necessary to equalize the temperature distribution on the liquid crystal panels 3.

Next, FIGS. 10A and 10B show the configuration for thermally mounting the water-cooling jacket 29 on the liquid crystal panels 3. The flexible tubes 32 having flexibility for cooling liquid circulation are provided at two locations on the top of the water-cooling jacket 29. Those may be pipes with no flexibility if there is no problem regarding assembly. Here, the water-cooling jacket 29 is provided at the location other than a light passage face on the liquid crystal panel 3. More specifically, the water-cooling jacket 29 is provided at a peripheral portion (at a location other than light a passage face) of the liquid crystal panels. Cooling liquid 31 such as water enters from an inlet side of the flexible tubes 32, flows so as to turn around the liquid crystal panel 3, and flows out of the outlet of the flexible tubes 32. The water-cooling jacket 29 has a partition plate 35 which determines the channel of the cooling liquid 31. It is possible to receive the heat emitted from the liquid crystal panel 3 with the water-cooling jacket 29.

FIG. 11 shows a detailed configuration of the liquid crystal panel 3. The liquid crystal panel 3 is comprised of the incoming polarizing plate 36, the liquid crystal panel body 30 and the outgoing polarizing plate 38, and FIG. 11 shows a layout plan in which the water-cooling jackets 29 are provided on both sides thereof. The light 27 passes through the incoming polarizing plate 36, the liquid crystal panel body 30 and the outgoing polarizing plate 38 in this order. The flexible tubes 32 are mounted on the respective water-cooling jackets 29 so as to supply the cooling liquid.

Figure 12:
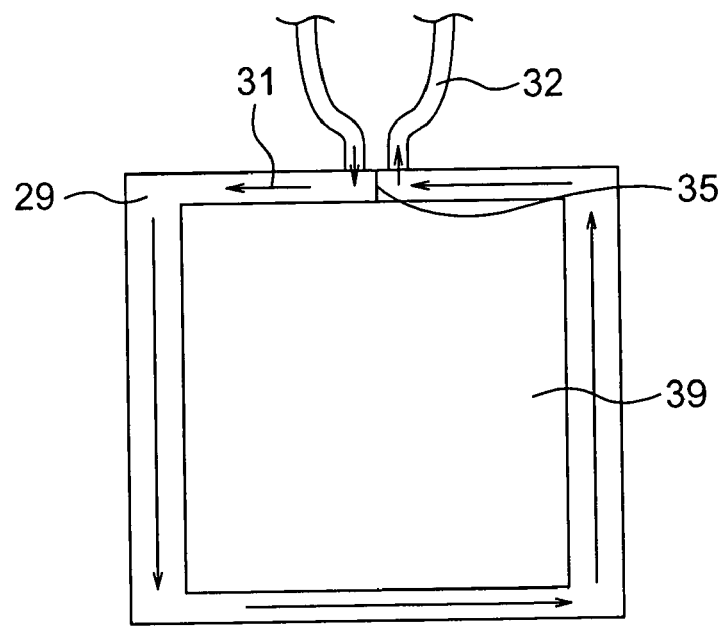
FIG. 12 corresponds to the A—A sectional view and the C—C sectional view of FIG. 11 for showing the flow of the cooling liquid.
Figure 13:
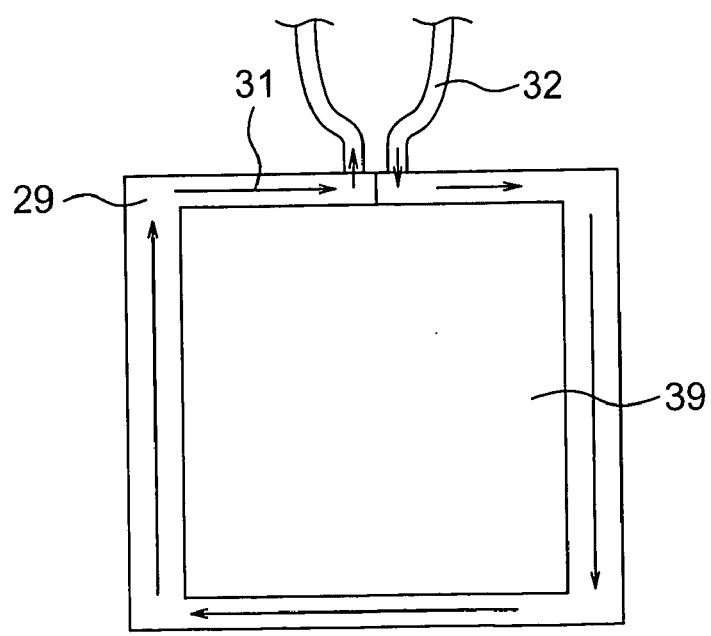
FIG. 13 corresponds to the B—B sectional view and the D—D sectional view of FIG. 11 for showing the flow of the cooling liquid.

FIG. 12 shows an overview of the A—A section and the C—C section of FIG. 11, and FIG. 13 shows an overview of the B—B section and the D—D section of FIG. 11. The water-cooling jacket 29 is provided at the location other than the light passage face on the liquid crystal panel body 30, and the space 39 is formed on the light passage face.

The difference between FIG. 12 and FIG. 13 is the flow direction of the cooling liquid 31. The temperature of the cooling liquid 31 is low on the inlet side of the flexible tubes 32. The temperature of the cooling liquid 31 is high on the outlet side of the flexible tubes 32 due to the heat-receiving action from the liquid crystal panel. Therefore, when providing the water-cooling jackets 29 on both sides of each of the incoming polarizing plate 36, the liquid crystal panel body 30 and the outgoing polarizing plate 38, it is possible, by alternately changing the flow direction of the cooling liquid 11, to perform symmetrical cooling on both sides of the incoming polarizing plate 36, the liquid crystal panel body 30 and the outgoing polarizing plate 38 so as to equalize the surface temperatures thereof.

FIGS. 14A and 14B show a configuration example different from FIG. 11. The water-cooling jacket 29 is thermally mounted on the liquid crystal panel 3 (the water-cooling jacket has the same dimension as the liquid crystal panel in the shown configuration example), and the cooling liquid 11 comes into the water-cooling jacket 29 from the flexible tube 32 on top of the water-cooling jackets 29 and flows out of the flexible tube 32 at the bottom of the water-cooling jacket 29. In the case of this configuration example, the water-cooling jacket 29 is also placed on the light passage face of the liquid crystal panel 3. The water-cooling jacket 29 and the cooling liquid 31 are made of material allowing the light to pass therethrough. For example, the water-cooling jacket 29 is made of sapphire glass, and the cooling liquid 31 is pure water.

Here, in the case that the temperature distribution arises in a vertical direction of the cooling liquid through which the light passes, the fluctuation occur in the cooling liquid 11. This would be because buoyancy force phenomenon occurs due to floating of the cooling liquid caused by the temperature difference in the cooling liquid 11 in the vertical direction. The buoyancy phenomenon of the cooling liquid occurs in the opposite direction to gravity. Therefore, the fluctuation of the cooling liquid tends to occur extremely in the case that the temperature difference arises in the gravity direction due to natural convection generated when retaining the cooling liquid without flowing the cooling liquid in the water-cooling jacket (in the case that the temperature in the lower portion of the cooling liquid is higher than that in the upper portion thereof). In the case of the configuration example shown in FIGS. 14A and 14B, the cooling liquid of low temperature enters from the upper portion of the water-cooling jacket by letting the cooling liquid 31 flow in the gravity direction. Therefore, it becomes difficult to generate the fluctuation due to the temperature difference in the cooling liquid 31. Thus, it is possible to prevent the fluctuation of the cooling liquid 31 and thus to curb the stripe pattern or the like in the light irradiation of the liquid crystal projector due to the fluctuation of the cooling liquid.

Next, according to the configuration example which includes the water-cooling jackets 29 on both sides of each of the incoming polarizing plate 36, the liquid crystal panel body 30 and the outgoing polarizing plate 38 shown in FIG. 15, the light 27 passes through the incoming polarizing plate 36, the liquid crystal panel body 30 and the outgoing polarizing plate 38 in this order. The flexible tubes 32 are mounted on each water-cooling jacket 29 so as to supply the cooling liquid thereto.

FIG. 16 shows the overview of the A—A section and the C—C section of FIG. 15, and FIG. 17 shows the overview of the B—B section and the D—D section of FIG. 15. The difference between the configuration examples shown in FIG. 16 and FIG. 17 is the flow direction of the cooling liquid 31. The temperature of the cooling liquid 31 is low on the inlet side of the flexible tubes 32 as in the cases of FIGS. 11, 12 and 13. The temperature of the cooling liquid 31 is high on the outlet side thereof due to the heat-receiving effect from the liquid crystal panel. Therefore, when providing the water-cooling jackets 29 on the incoming polarizing plate 36, the liquid crystal panel body 30 and the outgoing polarizing plate 38, it is possible, by alternately changing the vertical flow direction of the cooling liquid 31, to perform symmetrical cooling on both sides of the incoming polarizing plate 36, the liquid crystal panel body 30 and the outgoing polarizing plate 38 so as to equalize the surface temperatures thereof. Thus, it is possible to prevent the fluctuation of the cooling liquid 31 and thus to curb the generation of the stripe pattern or the like in the light irradiation of the liquid crystal projector.

According to the present invention, it is possible to prevent the boiling of the cooling liquid and to keep the high reliability of the projector because the cooling liquid does not directly contact the light source lamp of high temperature.

It is also possible to readily detach the heat receiving water-cooling jacket from the lamp and easily carry out the attaching and detaching work when replacing or maintaining the lamp. It is also possible to keep the sufficient amount of heat transport so as to maintain the same cooling performance irrespective of the installation condition of the projector.

Therefore, it is possible to provide the liquid crystal projector capable of satisfying high reliability, high cooling efficient, and maintainability.

Also, by placing the water-cooling jacket at a location other than the light passage portion in the liquid crystal panel of the liquid crystal projector, it is possible to emit a sufficient amount of light without blocking the light passing through the liquid crystal panel, while achieving a cooling action for the liquid crystal panel.

Furthermore, by providing the water-cooling jackets to the incoming polarizing plate, the liquid crystal panel body and the outgoing polarizing plate, respectively and by reversing the liquid circulation flow direction in each of the opposite water-cooling jackets, it is possible to equalize the surface temperatures and the cooling liquid temperature of the incoming polarizing plate, the liquid crystal panel body and the outgoing polarizing plate so as to prevent the fluctuation of the cooling liquid caused by temperature change in the cooling liquid and the stripe pattern in the light irradiation and to eliminate the color shading during the irradiation of the liquid crystal projector.

By providing a liquid inlet of the water-cooling jacket in the upper portion and a liquid outlet in the lower portion, it is also possible to prevent the fluctuation of the liquid in an antigravity direction in conjunction with a rise in the liquid temperature, and to eliminate the color shading during the irradiation of the liquid crystal projector.

It should be further understood by those skilled in the art that although the foregoing description has been made on embodiments of the invention, the invention is not limited thereto and various changes and modifications may be made without departing from the spirit of the invention and the scope of the appended claims.

What is claimed is:

1. A liquid crystal projector comprising:
   a light source lamp;
   a liquid crystal panel for displaying at least one color of red, green and blue;
   a power source for supplying electric power to an element in the liquid crystal projector;

a fan for removing heat generated by said power source and said lamp;

a water-cooling jacket provided on an inner surface of a part of an external wall of the liquid crystal projector, which part is adjacent to said lamp;

a metal pipe arrangement for heat radiation, placed in a part of the external wall except said part of the external wall having said water-cooling jacket on the inner surface thereof; and a cooling liquid driving means for driving cooling liquid to flow in the water-cooling jacket receiving the heat radiated from said lamp, wherein the cooling liquid receiving the heat generated by said lamp circulates in a circulation path through said water-cooling jacket, said metal pipe arrangement and said cooling liquid driving means to emit the heat to the outside through said metal pipe arrangement.

2. The liquid crystal projector according to claim 1, wherein a relaxation member for curbing heat transmission and lowering the temperature of the cooling liquid is provided between an external surface of said lamp and said water-cooling jacket so as to contact both the external surface of said lamp and said water-cooling jacket.

3. The liquid crystal projector according to claim 1, wherein a plurality of metallic heat absorbing fins are provided on said water-cooling jacket between an external surface of said lamp and said water-cooling jacket, so that an air layer is formed between tip ends of said heat absorbing fins and the external surface of said lamp.

4. The liquid crystal projector according to claim 1, wherein a relaxation member constituted by combining a plurality of metal plates and a heat insulator provided between the metal plates for lowering the temperature of the cooling liquid is provided between an external surface of said lamp and said water-cooling jacket so as to contact both the external surface of said lamp and said water-cooling jacket.

5. The liquid crystal projector according to claim 1, wherein said part of the external wall having said water-cooling jacket on the inner surface thereof is mounted rotatably, or movably.

6. The liquid crystal projector according to claim 2, wherein said part of the external wall having said water-cooling jacket on the inner surface thereof is mounted rotatably, or movably.

7. The liquid crystal projector according to claim 3, wherein said part of the external wall having said water-cooling jacket on the inner surface thereof is mounted rotatably, or movably.

8. The liquid crystal projector according to claim 4, wherein said part of the external wall having said water-cooling jacket on the inner surface thereof is mounted rotatably, or movably.

9. The liquid crystal projector according to claim 5, wherein a flexible pipe is connected to each of an inlet side and an outlet side of said water-cooling jacket.

10. The liquid crystal projector according to claim 6, wherein a flexible pipe is connected to each of an inlet side and an outlet side of said water-cooling jacket.

11. The liquid crystal projector according to claim 7, wherein a flexible pipe is connected to each of an inlet side and an outlet side of said water-cooling jacket.

12. The liquid crystal projector according to claim 8, wherein a flexible pipe is connected to each of an inlet side and an outlet side of said water-cooling jacket.

13. The liquid crystal projector according to claim 3, wherein each of said head absorbing fins has a surface of an uneven shape.

14. A liquid crystal projector comprising:

a light source lamp;

a liquid crystal panel for displaying at least one color of red, green and blue;

a power source for supplying electric power to each element in the liquid crystal projector;

a fan for removing heat generated by said liquid crystal panel and said lamp;

a water-cooling jacket provided on the liquid crystal panel comprising an incoming polarizing plate, a liquid crystal panel body and an outgoing polarizing plate, thorough which water-cooling jacket cooling liquid flows;

a metal pipe arrangement for heat radiation, placed in an external wall portion of a housing of said liquid crystal projector; and a cooling liquid driving means for driving the cooling liquid to flow in said water-cooling jacket receiving the heat radiated from said liquid crystal panel, wherein the cooling liquid receiving the heat generated by said lamp circulates in a circulation path through said water-cooling jacket, said metal pipe arrangement and said cooling liquid driving means to emit the heat the outside through said metal pipe arrangement.

15. The liquid crystal projector according to claim 14, wherein said water-cooling jacket is placed at a location other than a light passage portion in said liquid crystal panel.

16. The liquid crystal projector according to claim 14, wherein said water-cooling jacket is placed at in a light passage portion in said liquid crystal panel so that said liquid crystal panel is opposed to said water-cooling jacket in its whole area.

17. The liquid crystal projector according to claim 14, wherein said water-cooling jackets are provided between the incoming polarizing plate and the liquid crystal panel body and between the liquid crystal panel body and the outgoing polarizing plate, respectively, and on a light incoming side of said incoming polarizing plate and on a light outgoing side of said outgoing polarizing plate, so that the cooling liquids flowing in mutually opposed water-cooling jackets are in opposite directions.

18. The liquid crystal projector according to claim 15, wherein said water-cooling jackets are provided between the incoming polarizing plate and the liquid crystal panel body and between the liquid crystal panel body and the outgoing polarizing plate, respectively, and on a light incoming side of said incoming polarizing plate and on a light outgoing side of said outgoing polarizing plate, so that the cooling liquids flowing in mutually opposed water-cooling jackets are in opposite directions.

19. The liquid crystal projector according to claim 14, wherein said water-cooling jacket has an inflow opening for the cooling liquid in an upper portion thereof, and a discharge opening for the cooling liquid in a lower portion thereof.

\* \* \* \* \*